(12) United States Patent
Kim et al.

(10) Patent No.: US 8,663,504 B2
(45) Date of Patent: Mar. 4, 2014

(54) METHOD FOR GASIFICATION OF CARBON-CONTAINING MATERIALS BY THERMAL DECOMPOSITION OF METHANE AND CONVERSION OF CARBON DIOXIDE

(75) Inventors: Jin Hong Kim, Daejeon (KR); Sang Ho Lee, Daejeon (KR); Gyung Rok Kim, Daejeon (KR); Il Yong Jeong, Seoul (KR); Sun Choi, Daejeon (KR); Seung Hoon Oh, Seoul (KR); Gyoo Tae Kim, Daejeon (KR); Yong Il Lee, Daejeon (KR)

(73) Assignee: SK Innovations Co., Ltd., Seoul (KR)

( * ) Notice: Subject to any disclaimer, the term of this patent is extended or adjusted under 35 U.S.C. 154(b) by 0 days.

(21) Appl. No.: 13/388,702

(22) PCT Filed: Aug. 3, 2010

(86) PCT No.: PCT/KR2010/005101
§ 371 (c)(1),
(2), (4) Date: Jun. 7, 2012

(87) PCT Pub. No.: WO2011/016668
PCT Pub. Date: Feb. 10, 2011

(65) Prior Publication Data
US 2012/0241676 A1    Sep. 27, 2012

(30) Foreign Application Priority Data

Aug. 4, 2009  (KR) .................. 10-2009-0071688

(51) Int. Cl.
*C01B 3/24*  (2006.01)
*C01B 3/38*  (2006.01)

(52) U.S. Cl.
USPC ............................................. 252/373

(58) Field of Classification Search
USPC ............................................. 423/418.2
See application file for complete search history.

(56) References Cited

U.S. PATENT DOCUMENTS

| 4,410,504 A * | 10/1983 | Galasso et al. ............... 423/453 |
| 2005/0032920 A1* | 2/2005 | Norbeck et al. .............. 518/704 |

(Continued)

FOREIGN PATENT DOCUMENTS

| CN | 1059541 A | 3/1992 |
| CN | 1477090 A | 2/2004 |

(Continued)

OTHER PUBLICATIONS

Hirsch et al., "Catalytic Coal Gasification: An Emerging Technology", Science Magazine, Jan. 8, 1982, vol. 215, No. 4529, pp. 121-127.

(Continued)

*Primary Examiner* — Melvin C Mayes
*Assistant Examiner* — Douglas Call
(74) *Attorney, Agent, or Firm* — Fay Sharpe LLP; Richard M. Klein

(57) ABSTRACT

The present invention relates to a method for gasification of carbon-containing materials, and more specifically, to a method for gasification of carbon-containing materials which allows an increase in carbon efficiency and a reduction in carbon dioxide emission, comprising the steps of: gasification of carbon-containing materials to methane; thermal decomposition of $CH_4$ to C and $H_2$; and conversion of $CO_2$ to CO using the carbon produced during the decomposition. The method of the present invention greatly increases carbon efficiency and reduces the generation of carbon dioxide.

10 Claims, 2 Drawing Sheets

(56) References Cited

U.S. PATENT DOCUMENTS

2007/0124997 A1\* 6/2007 Liu et al. .................. 48/198.7
2007/0149392 A1\* 6/2007 Ku et al. ................... 502/240
2009/0217585 A1\* 9/2009 Raman et al. .............. 48/127.7

FOREIGN PATENT DOCUMENTS

| CN | 1974732 A | 6/2007 |
| CN | 101223103 A | 7/2008 |
| CN | 101426885 A | 5/2009 |
| JP | 2005-052690 A | 3/2005 |
| JP | 2005-517053 | 6/2005 |
| KR | 10-2004-0004799 A | 1/2004 |
| KR | 10-2008-0041635 A | 5/2008 |
| WO | WO 91/05734 | 5/1991 |
| WO | WO 2006/119118 | 11/2006 |
| WO | WO 2009/080297 | 7/2009 |

OTHER PUBLICATIONS

S.S. Penner, "Coal Gasification: Direct Applications and Syntheses of Chemicals and Fuels", A Research Needs Assessment by the DOE Coal Gasification Research Needs (COGARN) Working Group, Jun. 1987.

International Search Report for PCT/KR2010/005101 dated Apr. 28, 2011.

English Translation of Chinese Office Action of Corresponding Chinese Application No. 201080034787.3, Dated May 21, 2013.

\* cited by examiner

US 8,663,504 B2

METHOD FOR GASIFICATION OF CARBON-CONTAINING MATERIALS BY THERMAL DECOMPOSITION OF METHANE AND CONVERSION OF CARBON DIOXIDE

TECHNICAL FIELD

The present invention relates to a method of gasifying a carbonaceous material and, more particularly, to a method of gasifying a carbon-containing material, which is capable of increasing carbon efficiency and decreasing the generation of carbon dioxide.

BACKGROUND ART

With the drastic development of society since the 20$^{th}$ century, the supply and demand for energy has become unstable and environmental problems such as global warming have come to the fore, and thus attempts to use a type of fossil energy which is environmentally friendly continue, and thorough research into manufacturing processes for producing fuel that never causes environmental pollution is ongoing. Particularly instead of the direct combustion of coal, which causes severe environmental pollution, efforts are being made to convert coal into a gas fuel such as synthetic gas (which is a mixture comprising hydrogen, carbon monoxide, etc.), which is called gasification.

That is, the term gasification means that solid/liquid fuel including carbon as a basic component, such as coal, petroleum coke, biomass, etc., reacts with a gas such as oxygen, Steam, carbon dioxide, and hydrogen, thus producing combustible gases such as CO, $H_2$ and $CH_4$. This process is mainly carried out under conditions of high temperature and high pressure in order to maximize gasification capacity and efficiency, and the produced combustible gases are used as fuel gas for power generation or as feedstock for chemical products or synthetic petroleum via a methanol synthesis process, an $NH_3$ Synthesis process and a Fischer-Tropsch synthesis process, or hydrogen is maximally produced and utilized as a hydrogen source in the hydrothreating and the hydrocracking of crude oil.

A typical gasification system enables coal or other carbon-containing materials to react with steam and oxygen (or air) to produce a synthetic gas composed mainly of hydrogen and carbon monoxide.

FIG. 1 schematically shows a conventional gasification process. CTL (Coal-to-Liquids) using the conventional gasification process is described below.

Specifically, Steam, oxygen and coal are fed into a gasifier. The fed coal reacts with $H_2O$ and oxygen in the gasifier, thus generating a product including $H_2$, CO, $CO_2$, etc. The reactions in the gasifier are as follows.

$C+H_2O \rightarrow CO+H_2$ $C+CO_2 \rightarrow 2CO$ $C+O_2 \rightarrow CO_2$

The product generated in the gasifier is subjected to removal of particulate materials, Hg and NOx and then removal of acid gas to eliminate $H_2S$ and $CO_2$. Subsequently, the produced gases are selectively subjected to the water-gas shift process like that below so that they are used for F-T synthesis reaction or MeOH synthesis reaction, and the remaining $H_2$ is used alone.

<Water-Gas Shift Reaction>

$CO+H_2O \rightarrow H_2+CO_2$

<F-T Reaction>

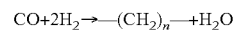

<Methanol (MeOH) Synthesis>

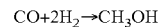

In the case where such a typical steam/oxygen gasifier is used, carbon gasification ($C+H_2O \rightarrow H_2+CO$ or $C+CO_2 \rightarrow 2CO$) is very highly endothermic, and thus the heat value corresponding thereto should be supplied by the combustion reaction of carbon ($C+O_2 \rightarrow CO_2$). Hence, part of the hydrocarbon used as the feed is converted into carbon dioxide following combustion inside or outside the gasifier. After gasification, in the case where the synthetic gas generated from the gasifier is subjected to a water-gas shift process so that the ratio of $H_2/CO$ in a synthetic gas that is stoichiometrically required for F-T synthesis or methanol production is set to 2, the theoretical carbon efficiency of the overall process is less than 49.8%, and the generation of $CO_2$ is calculated to be 0.502 mol $CO_2$/mol C or more. Here, the following definition of carbon efficiency is used.

Carbon efficiency(%)=(mol of CO in synthetic gas having $H_2$/CO of 2~2.1)×100/mol of carbon of gasification feed

| | |
|---|---|
| Gasification | 1.0C + 1.0H$_2$O --> 1.0H$_2$ + 1.0CO |
| Combustion | 0.34C + 0.34O$_2$ --> 0.34CO$_2$ |
| Water-gas Shift | 0.33CO + 0.33H$_2$O --> 0.33H$_2$ + 0.33CO$_2$ |
| Overall Reaction | 1.34C + 1.33H$_2$O + 0.34O$_2$ --> 1.33H$_2$ + 0.67CO + 0.67CO$_2$ |

Such low carbon efficiency decreases the profitability of CTL (Coal-to-Liquids). Also in order to reduce the generation of greenhouse gas $CO_2$, there is a need for an additional and very expensive facility in order to capture and store $CO_2$, making it difficult to construct profitable commercial plants.

Korean Patent Publication No. 2008-0041635 discloses an alkali metal catalytic steam gasification method using a $CO_2$ trap material and/or a mineral binder material in a gas generator. In order to increase the activity of the catalyst in the above patent, the $CO_2$ trap material for forming $CO_2$ into solid carbonate or bicarbonate is used but $CO_2$ cannot be converted into actually usable materials such as CO or the like. Furthermore, the above patent is problematic because a specific catalyst is used and a $CO_2$ trap material such as CaO or the like is additionally required.

DISCLOSURE

Technical Problem

Culminating in the present invention, intensive and thorough research aiming to solve the problems occurring in the related all resulted in the finding that thermal decomposition of methane may be additionally conducted after a gasification step using a catalyst, and part or all of the carbon thus generated may be recirculated to the gasification step, thereby increasing the carbon efficiency upon gasification, and also $CO_2$ conversion may be additionally performed to reduce the generation of $CO_2$.

Accordingly, an object of the present invention is to provide a process for gasifying a carbon-containing material, comprising decomposing methane and converting $CO_2$ in order to achieve a high carbon efficiency and reduce the generation of $CO_2$.

Technical Solution

In order to accomplish the above object, the present invention provides a method of gasifying a carbon-containing material, comprising i) reacting the carbon-containing material with steam in the presence of a catalyst thus producing a gas product including CO, $H_2$, $CO_2$, $CH_4$ and $H_2O$; ii) thermally decomposing $C_{1-14}$ generated in i) into C and $H_2$; and iii) converting $CO_2$ generated in i) into CO using the product of i) or ii).

Also the method may further comprise recirculating the carbon generated in to i) which gasifies the carbon-containing material.

Advantageous Effects

According to the present invention, the gasification method can achieve a high carbon efficiency of 63~73%, and can generate a remarkably decreased amount of $CO_2$ on the scale of 0.4 mol $CO_2$/mol C or less.

Also, additional devices and facilities for capturing and storing $CO_2$ are not required, thus making performing the process simple and cheap.

BEST MODE

Hereinafter, a detailed description will be given of the present invention with reference to the appended drawings.

The present invention provides a method of gasifying a carbon-containing material, which comprises methane decomposition and carbon dioxide conversion, in addition to typical catalytic gasification.

The present invention provides a method of gasifying a carbon-containing material, comprising i) reacting the carbon-containing material with steam in the presence of a catalyst, thus producing a gas product including CO, $CO_2$, $CH_4$, $H_2O$ and $H_2$; thermally decomposing $CH_4$ generated in i) into C and $H_2$; and converting $CO_2$ generated in i) into CO using the product of i) or ii).

Figure 2:
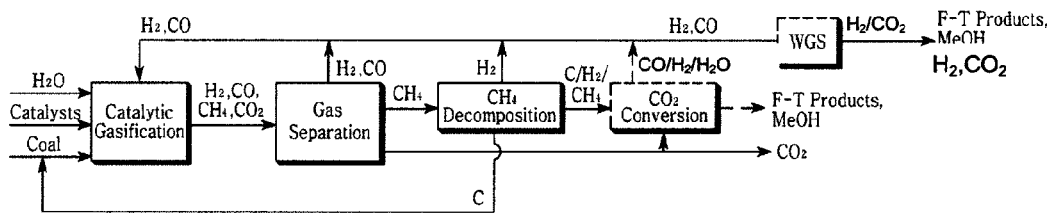
FIG. 2 is a schematic view showing a gasification process according to the present invention.

FIG. 2 schematically shows the process according to the present invention.

Specifically, the carbon-containing material is introduced to a gasification step along with $H_2O$ and a catalyst. As such, the catalyst may be a typical catalyst for gasification of a carbon-containing material, but is desirably a catalyst including alkali metal or alkaline earth metal. Typical examples of the alkali metal component may be Li, Na, K, Cs, Mg, Ca, etc., and the alkaline earth metal may be Mg, Ca, etc. The catalyst may be a hydroxide, oxide or salt of the above single metal, but may be used in a mixture of two or more metals. Such a metal component may be combined with a general gasification catalyst.

In the gasification step, the following reactions take place, so that $H_2$, CO, $CH_4$, $CO_2$, etc., are produced.

Gasification: $C+H_2O \rightarrow H_2+GO$, $C+CO_2 \rightarrow 2CO$
Water-gas shift: $CO+H_2O \rightarrow H_2+CO_2$
Methanation: $CO+3H_2 \rightarrow CH_4+H_2O$
Overall Reaction: $C+H_2O \rightarrow 0.5CH_4+0.5CO_2$ The product of the gasification step is $H_2$, CO, $CH_4$, and $CO_2$ including $H_2O$, and the product except for $H_2O$ comprises 20~25 vol % of $CH_4$, 20~25 vol % of $CO_2$, and a remainder of $H_2$ and CO. The ratio of $H_2$ and CO may vary depending on the amount of steam introduced into a gasifier. In the case where the ratio of steam to carbon in the gasifier is 1, $H_2$/CO may be about 1, and in the case where the ratio of steam to carbon is 2, $H_2$/CO may be about 4. More specifically, according to the results of operating the pilot plant available from Exxon, when the ratio of $H_2O$/C is 1.65, the amount of $CH_4$ of the product may be about 21 vol %, and $H_2$/CO may be about 3~4 [Science. 215 (4529), 1982, DOE Report, 1987 (DOE/ER-0326)].

In the case where the ratio of CO relative to $H_2$ in the gasification product is 3, the composition of the gasification product except for $H_2O$ includes 43.5 vol % of $H_2$, 14.5 vol % of CO, 21 vol % of $CH_4$, and 21 vol % of $CO_2$.

In the product of the gasification step, $H_2$ and CO may be recirculated to the gasification step. Although the amount of $H_2$ and CO which are recirculated is not particularly limited, it may fall in the range of 30~70% based on the total amount. If the recirculated amount is too large, improvements in the efficiency according to the present invention may reduce. In contrast, if the recirculated amount is too low, the operation of the gasifier may not be feasible.

In the method, i) may be catalytic gasification but the present invention is not limited thereto, and a gasification process wherein 10 vol % or more of methane is present in the gasification product may be applied.

The gasification method according to the present invention includes decomposing $CH_4$ generated in the above gasification step. The decomposition of $CH_4$ involves any process including thermal decomposition and catalytic cracking. Part or all of the carbon produced upon thermal decomposition of $CH_4$ may be recirculated to the gasification step. When carbon generated upon thermal decomposition of $CH_4$ is recirculated and used as the feed, the carbon efficiency in the gasification reaction may be increased.

$H_2$ generated upon $CH_4$ decomposition may increase the $H_2$ proportion of the synthetic gas which is the gasification product, and C generated upon $CH_4$ decomposition may be used as a reactant for conversion of $CO_2$ or as a fuel for supplying heat of reaction demanded for gasification.

The $CH_4$ decomposition reaction is endothermic, and the heat of reaction necessary therefor may be obtained by using, as fuel, carbon generated in the same process.

$$CH_4 \rightarrow C+2H_2 (\Delta H=18.0\ Kcal/mol)$$

$$C+O_2 \rightarrow CO_2 (\Delta H=-93.8\ Kcal/mol)$$

Next, the gasification method according to the present invention includes converting $CO_2$ generated in the gasification step or the like, e.g., into CO or $CH_3OH$ or F-T products. As such, the reaction for converting $CO_2$ may be any reaction for converting $CO_2$, including a C—$CO_2$ gasification reaction (C+$CO_2 \rightarrow 2CO$), a reverse water-gas shift reaction ($H_2$+

$CO_2 \rightarrow CO+H_2O$), a $CO_2$ hydrogenation reaction (n $CO_2$+3n $H_2 \rightarrow (CH_2)_n$—+2n $H_2O$, $CO_2+3H_2CH_3OH +H_2O$), and a $CO_2$ reforming reaction ($CO_2+CH_4 \rightarrow 2CO+2H_2$). The reactant used for converting $CO_2$ may be the product obtained in any one from i) to iii).

In this case, the kind of $CO_2$ conversion reaction used may be appropriately selected depending on the amount of converted carbon or the process conditions where the above reaction is applied. For example, when all of carbons produced upon $CH_4$ decomposition are recirculated to the gasification step, $CO_2$ may be converted via a reverse water-gas shift reaction or a hydrogenation reaction.

Also, $H_2$ and CO produced upon $CO_2$ conversion may be recirculated to the gasification step.

Produced by the gasification method according to the present invention, $H_2$ and CO may be utilized for Fischer-Tropsch synthesis or methanol synthesis, and $H_2$ itself may be produced as a product.

Also, the gasification method according to the present invention may further include performing a water-gas shift reaction ($CO+H_2O \rightarrow H_2+CO_2$) using $H_2$ and CO produced in respective steps, after $CO_2$ conversion.

The carbon-containing material used for the gasification method according to the present invention may include coal, biomass, waste, heavy oil, petroleum coke, etc., but the present invention is not limited thereto.

The method may further comprise performing gas separation after step i), which gasifies the carbon-containing material.

EXAMPLE

The method according to the present invention was performed at 650~700☐ under a pressure of 35 atm using an alkali metal catalyst. Also, the ratio of $H_2$/Co in a final product was adjusted to 2 so that the final product was adapted for a Fischer-Tropsch reaction and a methanol production reaction.

Comparative Example

Figure 1:
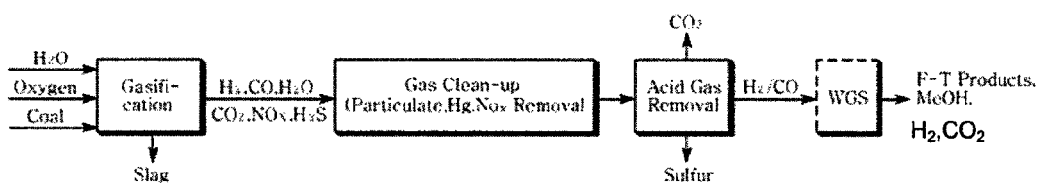
FIG. 1 is a schematic view showing a typical gasification process using Steam-oxygen gasification.

In a conventional gasification process of FIG. 1, a carbon-containing material was reacted with $H_2O$ and $O_2$ in a gasification step thus producing CO, $H_2$, $CO_2$, etc. Subsequently, Hg, NOx, etc., were removed from the gas product obtained in the gasification step, followed by removing the acid gas (i.e. $CO_2$ and sulfuric acid gas etc.). The gas product without Hg, NOx and acid gas was reacted with Steam ($CO+H_2O \rightarrow H_2+CO_2$). In the case where the ratio of $H_2/CO$ is adjusted to 2 via a water-gas shift reaction, the material balance of carbon in the comparative example is approximately represented below.

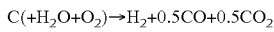

$C(+H_2O+O_2) \rightarrow H_2+0.5CO+0.5CO_2$

In this case, the carbon efficiency was 49.8%, and the amount of generated $CO_2$ was 0.502 mol/mol C.

Example 1

Figure 3:
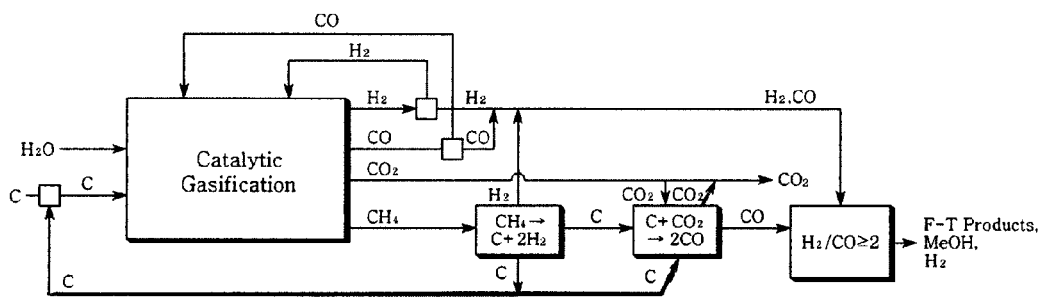
FIG. 3 is a schematic view showing the gasification process according to the present invention using a carbon-carbon dioxide gasification reaction for the carbon dioxide conversion.

In the present example shown FIG. 3, 50% of $H_2$ and CO in the gas product obtained in circulated to i). None of carbon generated in recirculated to i), and the total carbon was used as a heat source for $CH_4$ decomposition of or was fed to). In the present example, C—$CO_2$ gasification ($C+CO_2 \rightarrow 2CO$) was applied in iii). The gas produced in and fed to iii) was reacted with $CO_2$ produced in i), thus producing CO.

Specifically, $H_2$, CO and $CO_2$ were produced in i), and $H_2$ was produced in ii), and CO was produced in iii). The present example is schematically shown in FIG. 3.

The material balance of carbon in the present example is represented below.

$1.00C(+H_2O) \rightarrow 1.29H_2+0.63CO+0.37CO_2$

When the ratio of $H_2$ and CO which are finally produced in the present example was about 2.1, the carbon efficiency was about 62.7%, and the amount of generated $CO_2$ was about 0.374 mol/mol C, which were great improvements compared to when conventional steam-oxygen gasification was used.

Example 2

Figure 4:
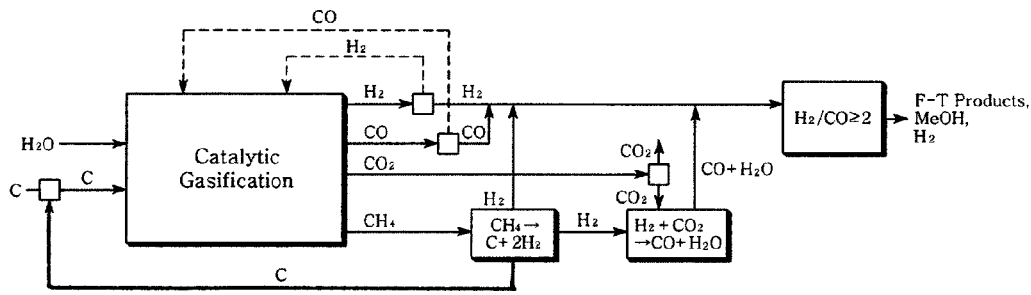
FIG. 4 is a schematic view showing the gasification process according to the present invention using a reverse water-gas shift reaction for the carbon dioxide conversion.

In this example shown in FIG. 4, a reverse water-gas shift reaction ($H_2+CO_2 \rightarrow CO+H_2O$) was used for the $CO_2$ conversion. According thereto, 50% of $H_2$ and CO of the gas product obtained in i) was recirculated to i). 80.8% of carbon generated in ii) was recirculated to i), and the remainder thereof was used as a heat source for $CH_4$ decomposition, and part of generated $H_2$ was fed to iii).

The hydrogen produced in and fed to iii) was reacted with $CO_2$ produced i), thus obtaining CO and $H_2O$. Finally, $H_2$, CO and $CO_2$ produced in i), $H_2$ produced in ii), and CO produced in iii) resulted in a synthetic gas wherein the ratio of $H_2/CO$ was 2.

The material balance of carbon in the present example is represented below.

$1.00C(+H_2O) \rightarrow 1.47H_2+0.73CO+0.27CO_2$

In this case, the carbon efficiency was about 73.3%, and the amount of generated $CO_2$ was about 0.267 mol/mol C, which were great improvements compared to when conventional steam-oxygen gasification was used.

Example 3

Figure 5:
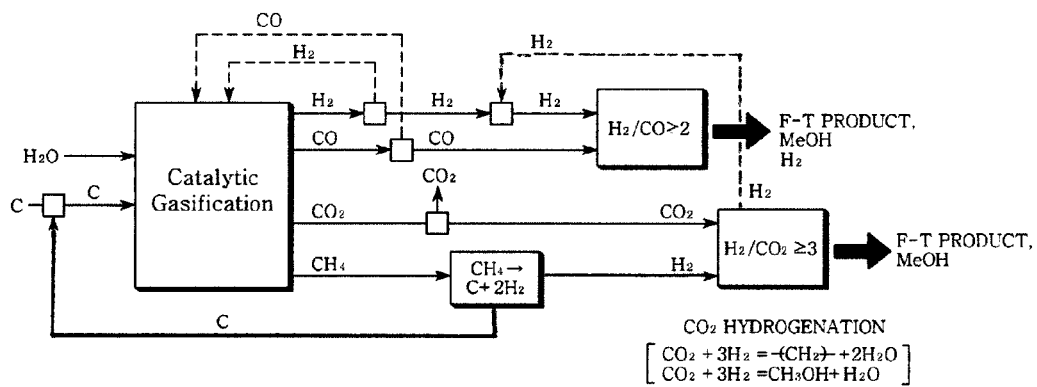
FIG. 5 is a schematic view showing the gasification process according to the present invention using a $CO_2$ hydrogenation reaction for the carbon dioxide conversion.

This example shown in FIG. 5 was performed by repeating Example 2, with the exception that $CO_2$ hydrogenation ($CO_2+3H_2 \rightarrow$—$(CH_2)$—$+2H_2O$, $CO_2+3H_2 \rightarrow CH_2OH+H_2O$) was used for the $CO_2$ conversion.

Example 4

In the present example, a $CO_2$ reforming reaction ($CO_2+CH_4 \rightarrow 2CO+2H_2$) was used for the $CO_2$ conversion.

Figure 6:
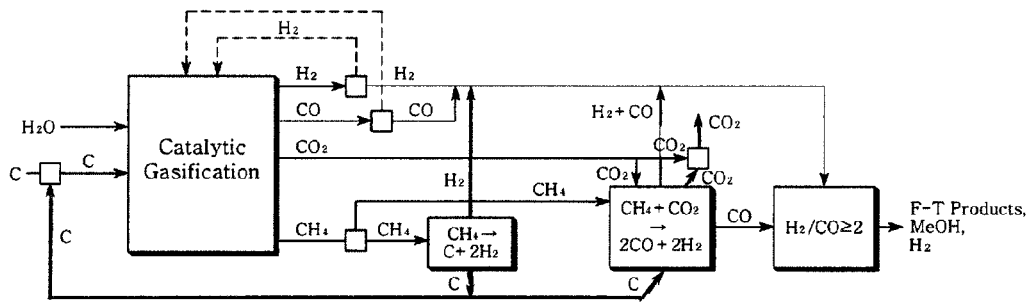
FIG. 6 is a schematic view showing the gasification process according to the present invention using a $CO_2$ reforming reaction for the carbon dioxide conversion.

Example 4 is schematically shown in FIG. 6. $H_2$ and CO produced in a gasification step of a carbon-containing material (i)) were recirculated in an amount of 50% as in the above example. Part of the methane produced in the gasification of the carbon-containing material was fed to a step of thermal decomposition of $CH_4$ (ii)), and part of the carbon thus produced was used as fuel to supply heat necessary for $CH_4$ decomposition and the remainder thereof was used as fuel to supply heat necessary for $CO_2$ reforming in iii).

The remainder of $CH_4$ produced in the gasification step of the carbon-containing material to the $CO_2$ conversion step in order to use it to convert $CO_2$. Upon converting $CO_2$, $CO_2$ was reacted with $CH_4$ to produce CO and $H_2$. The material balance of carbon in the present example is represented below.

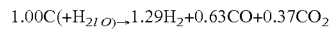

$1.00C(+H_{2IO}) \rightarrow 1.29H_2+0.63CO+0.37CO_2$

In the present example, when the synthetic gas wherein the ratio of $H_2/CO$ was 2.1 was finally produced, the carbon efficiency of about 62.8%, and the amount of generated $CO_2$ was about 0.372 mol/mol C. The carbon efficiency was greatly increased and the generation of $CO_2$ was remarkably decreased compared to when using conventional Steam-oxygen gasification.

The comparative example using typical gasification and Examples 1 to 4 according to the present invention are given in Table 1 below.

TABLE 1

|  | C. Ex. | Ex. 1 | Ex. 2 | Ex. 3 | Ex. 4 |
|---|---|---|---|---|---|
| C Efficiency (%) | 49.8 | 62.7 | 73.3 | 73.3 | 62.8 |
| $CO_2$ Generation ($CO_2$ mol/mol C) | 0.502 | 0.374 | 0.267 | 0.267 | 0.372 |
| $CO_2$ Conversion | No | C—$CO_2$ Gasification | Reverse Water-gas shift | Hydrogenation | $CO_2$ Reforming |

As is apparent from Table 1, in Examples 1 to 4 using the method according to the present invention, the carbon efficiency was much higher and the generation of $CO_2$ was remarkably lower, compared to the comparative example using typical gasification.

In respective examples, the ratio of $H_2/CO$ was adjusted to 2~2.1, but the present invention is not necessarily limited to this. For example, when the ratio of $H_2/CO$ is 4, hydrogen is in excess, and hydrogen that remains after Fischer-Tropsch synthesis or methanol synthesis may be produced alone as a product, and does not limit the present invention.

Also, a variety of materials may be used, and only the material balance of carbon was applied for the sake of convenience, but taking into consideration any original composition CxHyOz of the material, it appears that the carbon efficiency is further increased and the generation of $CO_2$ is further decreased.

Although the embodiments of the present invention have been disclosed for illustrative purposes, those skilled in the art will appreciate that a variety of different modifications and substitutions are possible, without departing from the scope and spirit of the invention as disclosed in the accompanying claims. Accordingly, such modifications and substitutions should also be understood as falling within the scope of the present invention.

The invention claimed is:

1. A method of gasifying a carbon-containing material, comprising:
    i) reacting the carbon-containing material with steam in the presence of a catalyst comprising a hydroxide, an oxide or a salt of an alkali metal or an alkaline earth metal, or a mixture thereof, to produce a gas product including CO, $CO_2$, $CH_4$, $H_2O$ and $H_2$, in which the ratio of steam to carbon is in a range of 1 to 2;
    ii) thermally decomposing $CH_4$ generated in step i) into elemental carbon and $H_2$, with at least a part of the elemental carbon generated being recirculated to step i); and
    iii) converting $CO_2$ generated in step i) into (a) CO through a reverse water-gas shift reaction, a $CO_2$ reforming reaction, or a C—$CO_2$ gasification reaction, and/or (b) into —($CH_2$)$_n$— or $CH_3OH$ through a $CO_2$ hydrogenation reaction using the product of step i) or step ii);
    wherein 30 to 70% of the total amount of $H_2$ and CO contained in the as product of step i) is recirculated back to step i).

2. The method of claim 1, further comprising recirculating $H_2$ generated in step ii) back to step i).

3. The method of claim 2, further comprising recirculating $H_2$ and CO generated in step iii) back to step i).

4. The method of claim 1, further comprising recirculating $H_2$ and CO generated in step iii) back to step i).

5. The method of claim 1, further comprising performing gas separation, after step i) which gasifies the carbon-containing material.

6. The method of claim 1, further comprising performing a water-gas shift reaction, after step iii).

7. The method of claim 1, wherein the carbon-containing material is coal, biomass, waste, heavy oil, or petroleum coke.

8. The method of claim 1, wherein the gas product except for $H_2O$ generated in step i) comprises 20 to 25 vol. % of $CH_4$, 20 to 25 vol. % of $CO_2$ and a remainder of $H_2$ and CO, the ratio of $H_2/CO$ being in a range of 1 to 4.

9. The method of claim 1, wherein the carbon efficiency is in a range of 63 to 73%.

10. The method of claim 1, wherein the amount of $CO_2$ generated is 0.4 mol $CO_2$/mol C or less.

* * * * *